US010205741B2

(12) United States Patent
Tao et al.

(10) Patent No.: US 10,205,741 B2
(45) Date of Patent: Feb. 12, 2019

(54) METHOD AND APPARATUS ENABLING BROWSERS TO PERFORM SECURITY SCAN OF DEVICES

(71) Applicant: TENCENT TECHNOLOGY (SHENZHEN) COMPANY LIMITED, Shenzhen (CN)

(72) Inventors: Yong Tao, Shenzhen (CN); Sha Mo, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 288 days.

(21) Appl. No.: 14/730,528

(22) Filed: Jun. 4, 2015

(65) Prior Publication Data

US 2015/0271190 A1    Sep. 24, 2015

Related U.S. Application Data

(63) Continuation of application No. PCT/CN2013/087470, filed on Nov. 20, 2013.

(30) Foreign Application Priority Data

Dec. 12, 2012 (CN) .......................... 2012 1 0541227

(51) Int. Cl.
*G06F 11/00* (2006.01)
*G06F 12/14* (2006.01)
(Continued)

(52) U.S. Cl.
CPC ............ *H04L 63/145* (2013.01); *G06F 21/55* (2013.01); *G06F 21/56* (2013.01);
(Continued)

(58) Field of Classification Search
USPC .......................................... 726/22
See application file for complete search history.

(56) References Cited

U.S. PATENT DOCUMENTS 6,289,371 B1 *   9/2001   Kumpf ................... H04L 29/06
                                                        709/203
7,178,166 B1     2/2007   Taylor et al.
(Continued)

FOREIGN PATENT DOCUMENTS

CN       1833228 A       9/2006
WO    2010019918 A1      2/2010

OTHER PUBLICATIONS

International Search Report for International Application No. PCT/CN2013/087470, dated Feb. 27, 2014.
(Continued)

*Primary Examiner* — Jeffrey C Pwu
*Assistant Examiner* — Samuel Ambaye
(74) *Attorney, Agent, or Firm* — Oblon, McClelland, Maier & Neustadt, L.L.P.

(57) ABSTRACT

A method and an apparatus enabling browsers to perform security scan of devices is described. The method includes receiving a device scan request triggered when a device scan function in a browser is selected by a user. The method further includes injecting a pre-defined device scan program into an engine of the browser according to the received device scan request, running the device scan program, and displaying a scan result on a scan result displaying interface of the browser. A security scan in the prevalent browser application adds different functions to the browser and exempts users from downloading dedicated device checking and management software.

20 Claims, 5 Drawing Sheets

(51) Int. Cl.
*G06F 12/16* (2006.01)
*H04L 29/06* (2006.01)
*G06F 21/55* (2013.01)
*G06F 21/56* (2013.01)
*H04L 29/08* (2006.01)

(52) U.S. Cl.
CPC .......... *H04L 63/1416* (2013.01); *H04L 67/02* (2013.01); *H04L 67/10* (2013.01)

(56) References Cited

U.S. PATENT DOCUMENTS

| | | | |
|---|---|---|---|
| 8,161,559 B2 | 4/2012 | Bowden et al. | |
| 2004/0205459 A1* | 10/2004 | Green | H04N 1/00222 715/273 |
| 2010/0175134 A1* | 7/2010 | Ali-Ahmad | H04L 63/1408 726/24 |
| 2010/0333205 A1 | 12/2010 | Bowden et al. | |
| 2012/0086989 A1* | 4/2012 | Collins | H04N 1/00244 358/403 |

OTHER PUBLICATIONS

He, Ya "Study and Design of Extension Mechanisms of Embedded Browser"; Dec. 15, 2011; China Master Dissertations Full-Test Database, Information Science and Technology, vol. 12, pp. 4-7.
International Preliminary Report for Application No. PCT/CN2013/087470 dated Jun. 25, 2015.
Chinese Office Action for Application No. 2012105412278 dated Aug. 1, 2017, and an English concise explanation of relevance thereof.

* cited by examiner

METHOD AND APPARATUS ENABLING BROWSERS TO PERFORM SECURITY SCAN OF DEVICES

CROSS-REFERENCE TO RELATED APPLICATIONS

This application is a continuation of International Application No. PCT/CN2013/087470, filed Nov. 20, 2013. This application claims the benefit and priority of Chinese Application No. 201210541227.8, filed Dec. 12, 2012. The entire disclosures of each of the above applications are incorporated herein by reference.

FIELD

The present disclosure relates to Internet browsers and to a method and apparatus enabling browsers to perform security scan of devices.

BACKGROUND

This section provides background information related to the present disclosure which is not necessarily prior art.

The mobile Internet and hardware techniques of various smart terminal devices, e.g., mobile phones, tablets, and the like are evolving rapidly. Smart terminal devices are equipped with higher-performance hardware and are capable of running more and more diversified application programs.

In conventional art, professional applications are generally adopted to check and manage software and hardware in smart terminal devices and mainly provide functions of examination, monitoring, optimization of the devices, virus prevention, security scan, and so on. The professional applications provide helpful assistance to users in the management of smart terminal devices.

SUMMARY

This section provides a general summary of the disclosure, and is not a comprehensive disclosure of its full scope or all of its features.

Various embodiments provide a method and an apparatus enabling browsers to perform security scan of devices.

A method enabling browsers to perform security scan of devices may include:

receiving a device scan request triggered when a user selects a device scan function provided by a browser;

injecting a pre-defined device scan program into an engine of the browser according to the device scan request received; and running the device scan program to scan a device, and displaying a scan result in a displaying interface of the browser.

An apparatus enabling browsers to perform security scan of devices may comprise:

a receiving module, adapted to receive a device scan request triggered when a user selects a device scan function provided by a browser;

a processing module, adapted to inject a pre-defined device scan program into an engine of the browser according to the device scan request received, and run the device scan program to scan a device; and a displaying module, adapted to display a scan result on a scan result displaying interface of the browser.

Various embodiments implement security scan in the prevalent browser application, which adds different browser functions and exempts users from downloading dedicated device check and management software and makes it easier for users to check and manage their smart user terminals.

Further areas of applicability will become apparent from the description provided herein. The description and specific examples in this summary are intended for purposes of illustration and are not intended to limit the scope of the present disclosure.

DRAWINGS

The drawings described herein are for illustrative purposes of various embodiments and not all possible implementations, and are not intended to limit the scope of the present disclosure.

Features of the present disclosure are illustrated by way of example and are not limited in the following figures, in which like numerals indicate like elements.

Corresponding reference numerals indicate corresponding parts throughout the various views of the drawings.

DETAILED DESCRIPTION

Example embodiments will now be described more fully with reference to the accompanying drawings.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. Due to characteristics of the Chinese language, quantities of an element, unless specifically mentioned, may be one or a plurality of, or at least one.

Figure 1:
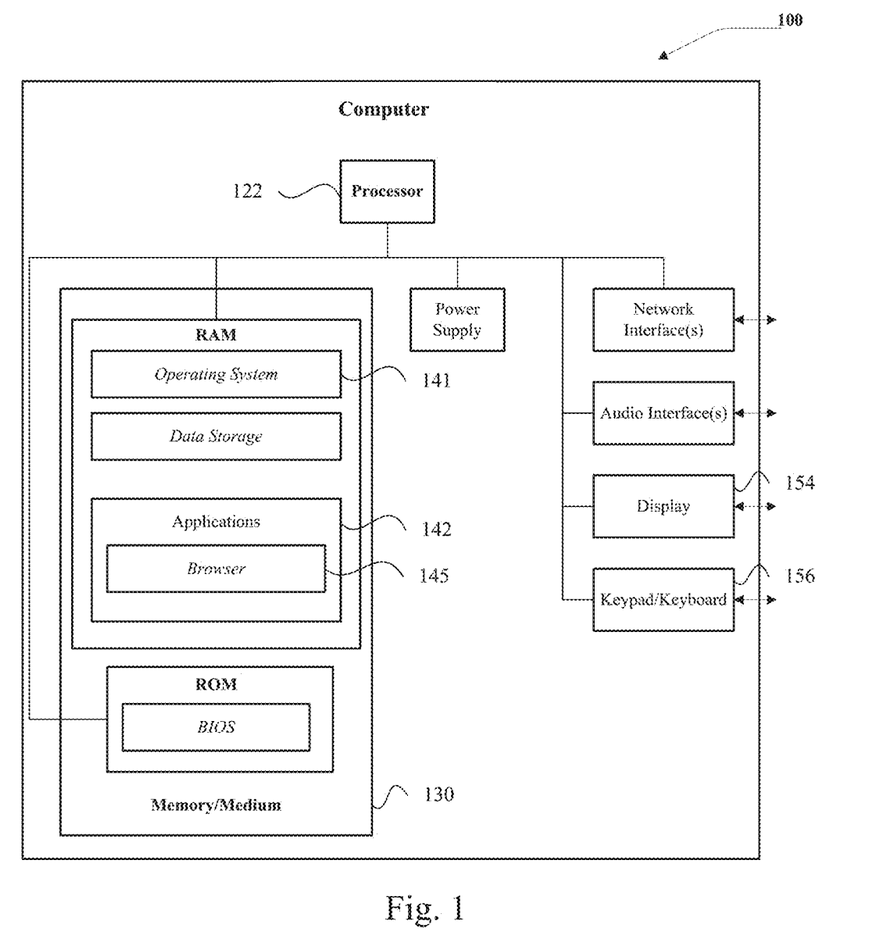
FIG. 1 is a diagram illustrating an example of a computing device according to various embodiments.

According to various embodiments, a computing device may execute methods and software systems of the present disclosure. FIG. 1 is a diagram illustrating an example of a computing device. As shown in FIG. 1, computing device 100 may be capable of executing a method and apparatus of the present disclosure. The computing device 100 may, for example, be a device such as a personal desktop computer or a portable device, such as a laptop computer, a tablet computer, a cellular telephone, or a smart phone. The computing device 100 may also be a server that connects to the above devices locally or via a network.

The computing device 100 may vary in terms of capabilities or features. Claimed subject matter is intended to cover a wide range of potential variations. For example, the computing device 100 may include a keypad/keyboard 156. It may also include a display 154, such as a liquid crystal display (LCD), or a display with a high degree of functionality, such as a touch-sensitive color 2D or 3D display. In contrast, however, as another example, a web-enabled computing device 100 may include one or more physical or virtual keyboards and mass storage medium 130.

The computing device 100 may also include or may execute a variety of operating systems 141, including an operating system, such as a Windows™ or Linux™, or a mobile operating system, such as iOS™, Android™, or Windows Mobile™. The computer 100 may include or may execute a variety of possible applications 142, such as a browser 145. The browser 145 may be enabled to perform security scan of the computing device 100.

The computing device 100 may include one or more non-transitory processor-readable storage media 130 and one or more processors 122 in communication with the non-transitory processor-readable storage media 130. For example, the non-transitory processor-readable storage media 130 may be a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media 130 may store sets of instructions, or units and/or modules that comprise the sets of instructions, for conducting operations described in the present disclosure. The one or more processors may be configured to execute the sets of instructions and perform the operations according to various embodiments.

Figure 2:
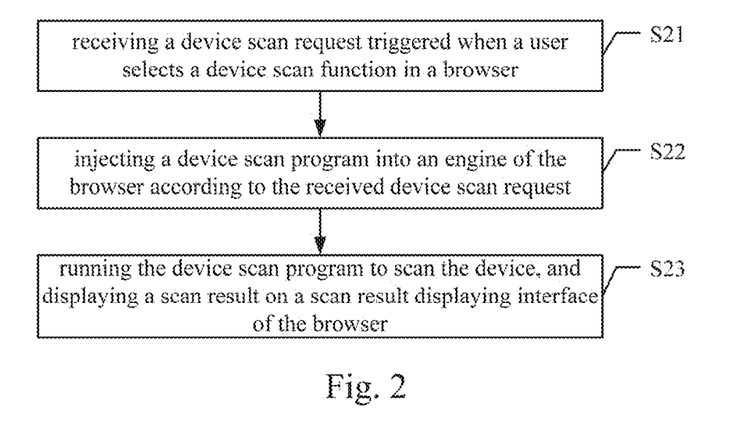
FIG. 2 is a flowchart illustrating a method enabling browsers to perform security scan of devices according to various embodiments.

FIG. 2 is a flowchart illustrating a method enabling browsers to perform security scan of devices according to various embodiments. The method may be applied to a browser in a smart terminal device such as a smart phone or a tablet computer to implement security scan of the smart terminal device. The method may include the following procedures.

Block S21: A device scan request (also referred to as device check request or device examination request) triggered when a user selects a device scan function (also referred to as device check function or device examination function) provided by a browser is received. According to various embodiments, the browser may be associated with one or multiple pre-defined device scan programs (also referred to as device check programs or device examination programs). For example, the one or multiple pre-defined device scan programs may be embedded in the browser or encapsulated into APIs as java class files so that the browser may obtain a device scan program by calling an API. The device scan programs may include, but are not limited to, a program for scanning and displaying a device name, a program for scanning currently running programs and displaying the number of the running programs, a program for scanning device memory and displaying occupied memory and available memory, a program for scanning trash data and displaying the amount of trash data, a program for scanning and displaying installed software, a program for scanning and displaying a Trojan, and so on. An interface to the device scan function may be set on a blank starting page in the browser, e.g., a button or a device scan window may be provided so that when the user clicks on the button or the device scan window, a device scan request triggered by the selection of the device scan function in the browser by the user may be received, which then triggers the following procedures in blocks S22 and S23 to perform corresponding device scan operations.

Block S22: A pre-defined device scan program is injected into an engine of the browser according to the device scan request received.

Block S23: The device scan program is triggered to scan the device, and a scan result is displayed on a scan result displaying interface of the browser. If the device scan programs are embedded in the browser, the device scan programs embedded in the browser are called and injected into the engine of the browser in block S22 to run the device scan programs so as to scan and display current conditions about power usage of the device, memory usage, trash data in the cache, currently-running programs, and so on. If the browser is associated with the device scan programs via APIs, an API is called to obtain a pre-defined device scan program based on the received device scan request in block S22, and the device scan program is injected into the engine of the browser. Then the device scan program is started in block S23 to scan and display current conditions of power consumption, memory usage, trash data in the cache, currently-running programs, and so on. Block S22 may include: calling an API according to the received device scan request to obtain a pre-defined device scan program, injecting the obtained device scan program into the engine of the browser.

According to various embodiments, if the device scan program includes a check and optimization program, the procedure of triggering the device scan program in block S23 may include running the check and optimization program to check the device, displaying a check progress and a check result or the check result on a check result displaying interface of the browser. After receiving an optimizing request from the user, running the check and optimization program to optimize the device based on the check result, and displaying an optimization result on a scan result displaying interface of the browser as the scan result. According to various embodiments, if the device scan program includes a device check program, the procedure of triggering the device scan program may include running the device check program and displaying a check progress and a check result or the check result on the scan result displaying interface of the browser as the scan result. If a device check is performed, the procedure of displaying the check result in block S103 may include: displaying the amount of remaining power, the amount of occupied memory, the amount of trash data in the cache, and the like. If both a device check and device optimization are performed, the amount of battery life prolonged by enabling a battery saving function, the amount of freed memory, the amount of deleted trash data in the cache, and the like may be displayed in block S23.

Various embodiments have one or more of the following features.

Various embodiments implement security scan in the prevalent browser application, which not adds different functions to the browser and exempts users from downloading software dedicated to device check and management, thus making it easier for users to check and manage their smart terminal devices.

Figure 3:
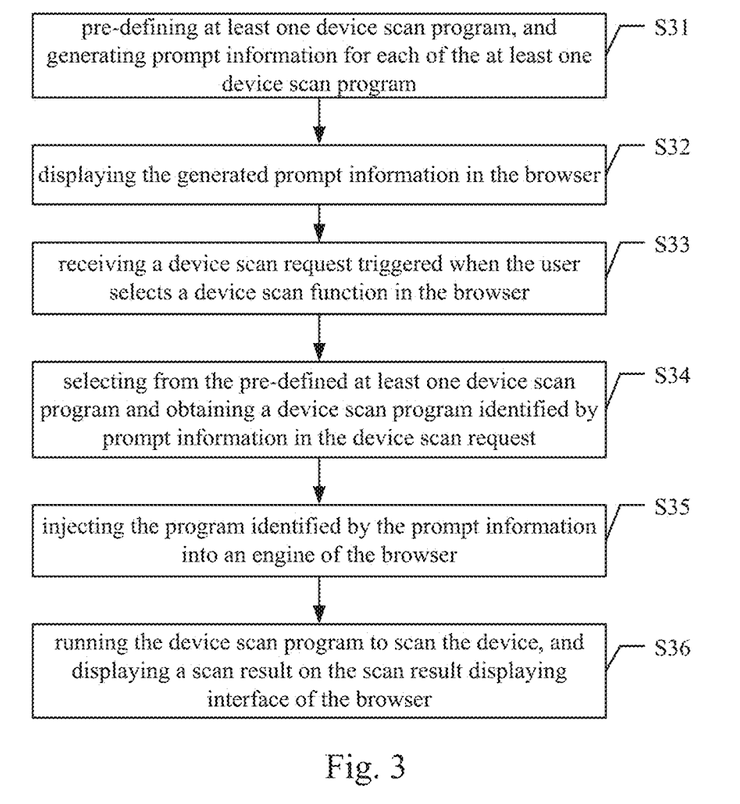
FIG. 3 is a flowchart illustrating a method enabling browsers to perform security scan of devices according to various embodiments.

FIG. 3 is a flowchart illustrating a method enabling browsers to perform security scan of devices according to various embodiments. The method may be applied to a browser in a smart terminal device such as a smart phone, or a tablet computer to implement security scan of the smart terminal device. The method may include the following procedures.

Block S31: At least one device scan program is pre-defined and prompt information for each of the at least one device scan program is generated. Device check and optimization items to be provided by the browser for the user may be determined based on a check scheme. Programs corresponding to the items may be encapsulated into APIs in the form of class files so that the browser may call device scan programs by using the APIs. Prompt information is generated for each of the device scan programs.

Block S32: The prompt information generated for each of the at least one device scan programs is displayed in the browser so that the user can select a device scan function based on the prompt information and trigger a device scan request which includes prompt information corresponding to one of the at least one device scan program.

Block S33: A device scan request triggered when a user selects a device scan function provided by the browser is received. The browser may provide an interface to the device scan functions in a blank starting page. The interface may be a button or a device scan window. The prompt information generated may also be displayed on the blank starting page. For example, the prompt text "get knowledge of phone quickly" may be displayed under the button or the device scan window to inform the user that the user can use the option to get knowledge of usage of the battery and the memory card of the phone. The prompt text "One-key release of system memory" may be displayed to inform the user that the user can use the option to check and release memory space. If the user clicks on the button or the device scan window and has selected prompt information corresponding to a device scan program, the browser may receive a device scan request triggered by the user selecting the device scan function in the browser. Procedures in blocks S304 to S36 are performed to perform corresponding device scan process.

Block S34: A device scan program identified by the prompt information in the device scan request is selected and obtained from pre-defined device scan programs. The procedure of selecting and obtaining a device scan program identified by the prompt information in the device scan request from pre-defined device scan programs may include selecting from device scan programs embedded in the browser and obtaining the device scan program identified by the prompt information in the device scan request or calling an API corresponding to the device scan program identified by the prompt information in the device scan request to obtain the device scan program.

Block S35: The device scan program identified by the prompt information is injected into the engine of the browser.

Block S36: The device scan program is started up to scan the device and a scan result is displayed on a scan result displaying interface of the browser. According to various embodiments, if the device scan program includes a check and optimization program, the procedure of starting the device scan program in block S36 may include running the check and optimization program to check the device, displaying a check progress and a check result or merely the check result on a check result displaying interface of the browser, after an optimization request is received from the user, running the check and optimization program to optimize the device based on the check result, and displaying an optimization result on the scan result displaying interface of the browser as the scan result. According to various embodiments, if the device scan program includes a device check program, the procedure of starting the device scan program may include running the device check program and displaying a check progress and a check result or merely the check result on the scan result displaying interface of the browser as the scan result.

If a device check is performed, the procedure of displaying the check result in block S36 may include displaying the amount of remaining battery power, the amount of occupied memory space, the amount of trash data in the cache, and the like. If both a device check and device optimization are performed, the amount of battery life prolonged by enabling a battery saving function, the amount of freed memory space, the amount of deleted trash data in the cache, and the like may be displayed in block S36.

Various examples of the method enabling browsers to perform security scan of devices are described with reference to FIGS. 4 to 7.

Figure 4:
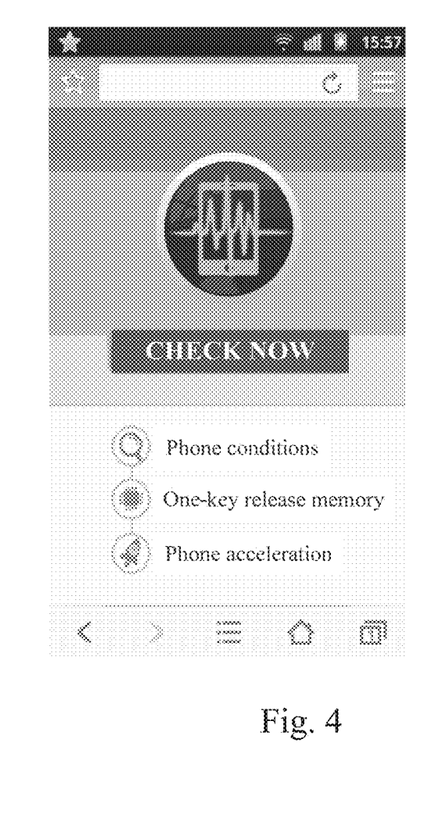
FIG. 4 is a diagram illustrating a device checking page presented by a browser according to various embodiments.

FIG. 4 is a diagram illustrating a device check page presented by a browser according to various embodiments. As shown in FIG. 4, buttons are provided on a starting page of the browser and prompt information about device scan programs is also displayed for the user to make a decision. After the user selects a device scan program and clicks on "check now", a device scan request is triggered. The browser starts a check procedure after receiving the device scan request.

Figure 5:
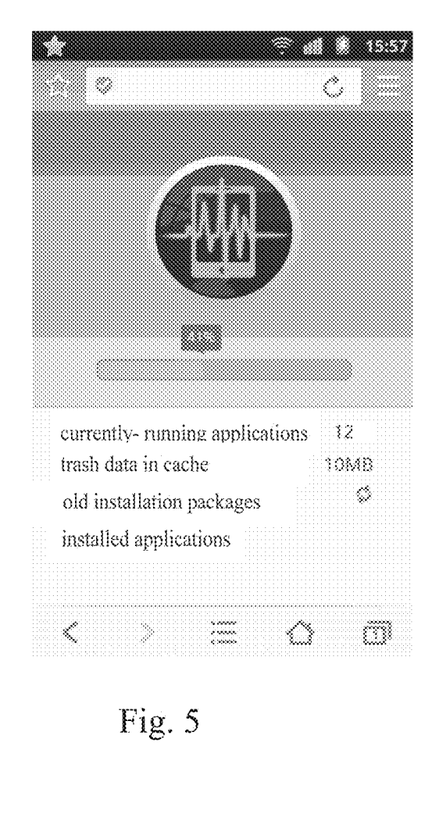
FIG. 5 is a diagram illustrating a page presenting a checking process in a browser according to various embodiments.

FIG. 5 is a diagram illustrating a page presenting a checking process in a browser according to various embodiments. The browser calls an API to obtain a device scan program and injects the device scan program into the engine of the browser to run the device scan program. The device scan program may include a device check and optimization program for checking the smart terminal device in which the browser is installed. The checking procedure may include checking battery consumption, occupied memory space, usage of a memory card, and the like. A check result is displayed on the page as shown in FIG. 6.

Figure 6:
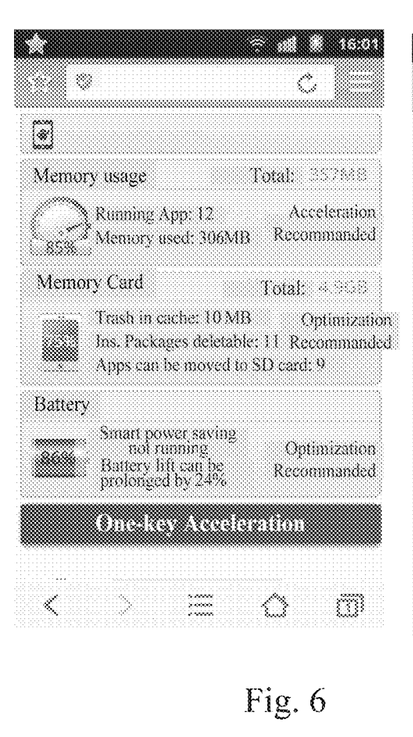
FIG. 6 is a diagram illustrating a page presenting a check result in a browser according to various embodiments.

FIG. 6 is a diagram illustrating a page presenting a check result in the browser. Information about memory usage, memory card usage, battery power and so on is displayed. A button for "One-key acceleration" is provided to inform the user that further optimization may be performed.

Figure 7:
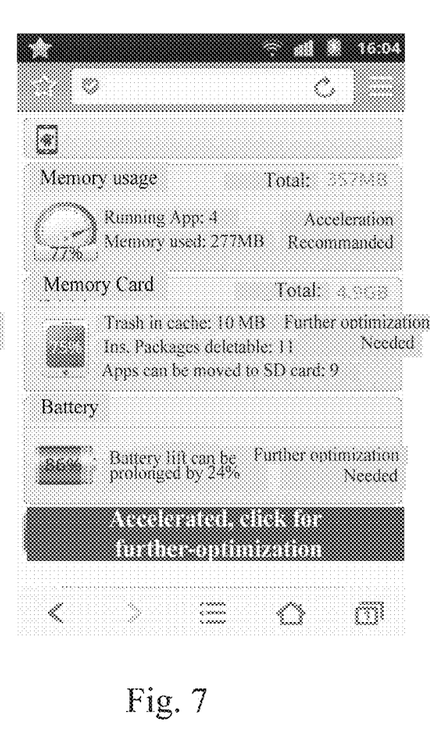
FIG. 7 is a diagram illustrating a scan result after an optimization process performed by a browser according to various embodiments.

FIG. 7 is a diagram illustrating a scan result after an optimization process performed by a browser. After the user clicks on the one-key acceleration, the browser calls the device scan program, which includes the device checking and optimization program again to optimize the memory space, the memory card and the battery, and a final scan result obtained is displayed on the scan result displaying interface of the browser.

Various embodiments have one or more of the following features.

Various embodiments implement security scan in the prevalent browser application, which adds different functions to the browser and exempts users from downloading dedicated device checking and management software and makes it easier for users to check and manage their intelligent user terminals. The user can select one or multiple device scan functions from a webpage of the browser to implement targeted scanning and management, which is more convenient for the user.

The following is a detailed description of an apparatus enabling browsers to perform security scan of devices according to various embodiments.

Figure 8:
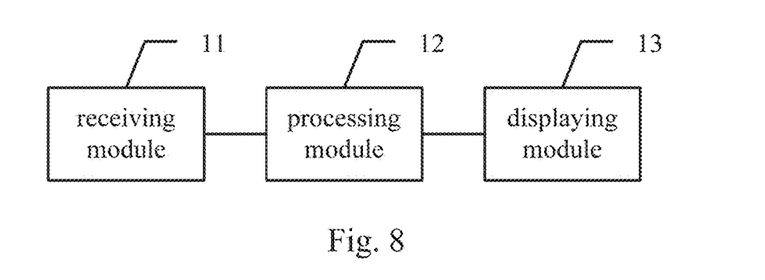
FIG. 8 is a flowchart illustrating an apparatus enabling browsers to perform security scan of devices according to various embodiments.

FIG. 8 is a diagram illustrating an apparatus enabling browsers to perform security scan of devices according to various embodiments. The apparatus may be configured in a smart terminal device such as a smart phone, a tablet computer, and the like. The apparatus may include the following components.

A receiving module 11 is adapted to receive a device scan request triggered when a user selects a device scan function provided by a browser. A processing module 12 is adapted to inject a pre-defined device scan program into an engine of the browser according to the device scan request received, and run the device scan program. A displaying module 13 is adapted to display a scan result on a scan result displaying interface of the browser.

According to various embodiments, the browser may be associated with one or multiple pre-defined device scan programs. For example, the one or multiple pre-defined device scan programs may be embedded in the browser or may be encapsulated into APIs as java class files so that the browser may obtain a device scan program by calling an API when necessary. The device scan program may include, but is not limited to, a program for scanning and displaying a device name, a program for scanning currently-running programs and displaying the number of running programs, a program for scanning device memory and displaying the amount of occupied memory space and available memory space, a program for scanning trash data in the cache and displaying the amount of trash data, a program for scanning and displaying installed software, a program for scanning and displaying Trojans, and so on.

An interface to the device scan function may be set on a blank starting page in the browser, e.g., a button or a device scan window may be provided so that when the user clicks on the button or the device scan window, the receiving module 11 may receive a device scan request triggered by the selection of the device scan function in the browser by the user and trigger the processing module 12 and the displaying module 13 to perform corresponding device scan operations.

If the device scan programs are embedded in the browser, the processing module 12 may call the device scan programs embedded in the browser and inject the device scan programs into the engine of the browser to run the device scan programs so as to scan and display current conditions about power consumption, memory usage, trash data in the cache, currently-running programs in the device, and so on. If the browser is associated with the device scan programs via APIs, the processing module 12 may call an API to obtain a pre-defined device scan program based on the received device scan request, and inject the device scan program into the engine of the browser to run the device scan program to scan and display current conditions of power consumption, memory usage, trash data in the cache, currently-running programs in the device, and so on.

According to various embodiments, if the device scan program includes a check and optimization program, the processing module 12 may run the check and optimization program to check the device, display a check progress and a check result or the check result on a check result displaying interface of the browser; after an optimization request is received from the user, run the check and optimization program to optimize the device based on the check result, and display an optimization result on the scan result displaying interface of the browser as the scan result.

According to various embodiments, if the device scan program includes a device check program, the processing module 12 may run the device check program and display a check progress and a check result or the check result on the scan result displaying interface of the browser as the scan result. If a device check is performed, the displaying module 13 may: display remaining battery life, the amount of occupied memory space, the amount of trash data in the cache, and the like. If both a device check and device optimization are performed, the displaying module 13 may display the amount of battery life prolonged by enabling a battery saving function, the amount of freed memory space, the amount of trash data deleted from the cache, and the like.

Various embodiments have one or more of the following features. Various embodiments implement security scan in the prevalent browser application, which adds different functions to the browser and exempts users from downloading dedicated device checking and management software and makes it easier for users to check and manage their intelligent user terminals.

Figure 9:
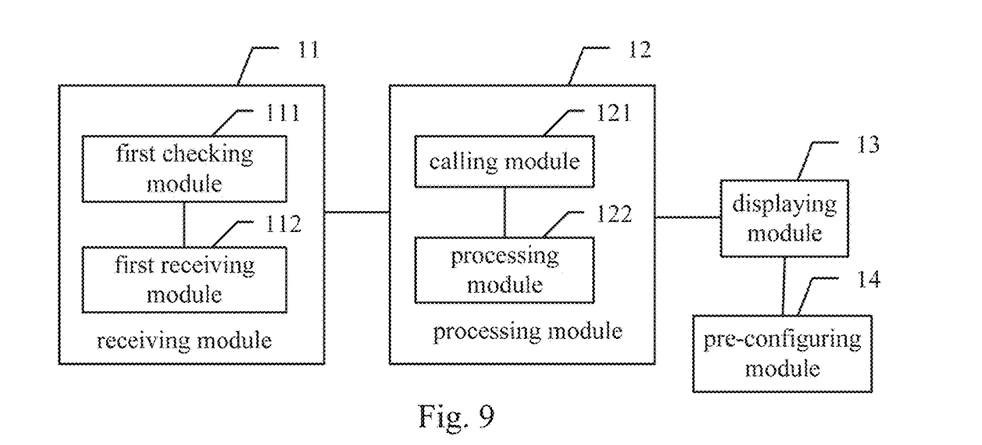
FIG. 9 is a flowchart illustrating an apparatus enabling a browser to perform security scan according to various embodiments.

FIG. 9 is a diagram illustrating an apparatus enabling a browser to perform security scan according to various embodiments. The apparatus may be embedded in a smart terminal device such as a cell phone, a tablet computer and so on. The apparatus may include the receiving module 11, the processing module 12, and the displaying module 13 as shown in FIG. 7. According to various embodiments, the receiving module 11 may include the following components.

A first checking module 111 is adapted to check whether a device scan button presented on a page describing functions of the browser or presented in a function list of the browser is clicked on by the user. A first receiving module 112 is adapted to take a command corresponding to the selected device scan button as the device scan request received.

When an interface to the device scan functions provided by the browser is a button for device scan on a page presenting functions of the browser or a button for device scan in a function list of the browser, the first checking module 111 and the first receiving module 112 are adapted to obtain the device scan request. According to various embodiments, when the interface to the device scan functions set in the browser is a web address for enabling the device scan functions, the receiving module 11 may also include the following components.

A second checking module is adapted to check whether a pre-defined web address has been input by the user into the browser. A second receiving module is adapted to take a request for visiting the web address as the device scan request if the second checking module determines the pre-defined web address has been input by the user into the browser.

According to various embodiments, the processing module 12 may include the following components. A calling module 121 is adapted to call an API to obtain the pre-defined device scan program according to the device scan request. A processing module 122 is adapted to inject the device scan program obtained into the engine of the browser and run the device scan program. If the browser is associated with the device scan programs via APIs, the processing module 121 may call an API to obtain a pre-defined device scan program based on the received device scan request, the processing module 122 injects the obtained device scan program into the engine of the browser to run the device scan program to scan current conditions of battery life, memory usage, trash data in the cache, currently-running programs in the device, and so on.

According to various embodiments, if the device scan program run by the processing module 12 includes a device check and optimization program, the processing unit 122 is adapted to run the device check and optimization program to check the device and run the device check and optimization program to optimize the device based on a check result after receiving an optimization request from the user. The displaying module 13 is adapted to display a check progress and a check result or the check result on a check result displaying interface of the browser and display an optimization result of the processing unit 122 on the scan result displaying interface of the browser as the device scan result. According to various embodiments, if the device scan program run by the processing module 12 includes a check program, the processing unit 122 is adapted to run the check program and the displaying module 13 is adapted to display a check progress and a check result or the check result on the scan result displaying interface as the device scan result.

According to various embodiments, the apparatus may also include a pre-configuring module 14, adapted to pre-define at least one device scan program, and generate prompt information for each of the at least one device scan program. The displaying module 13 is further adapted to display the prompt information generated for each of the at least one device scan program in the browser so that the user can select the device scan function based on the prompt information and trigger a device scan request which includes prompt information corresponding to one of the at least one device scan program. According to various embodiments, the displaying module 14 may display the prompt information generated for each of the at least one device scan program while displaying a button for device scan in a page presenting functions of the browser or in a function list of the browser, so that the user can select the device scan function according to the prompt information and trigger the device scan request, which includes the prompt information corresponding to the device scan function. The processing module 12 is adapted to select from the at least one pre-defined device scan program and obtain a device scan program corresponding to the prompt information in the received device scan request, inject the obtained device scan program into the engine of the browser, and run the device scan program.

Various embodiments have one or more of the following features. Various embodiments implement security scan in the prevalent browser application, which adds different functions to the browser and exempts users from downloading dedicated device checking and management software and makes it easier for users to check and manage their intelligent user terminals. The user can select one or multiple device scan functions from a webpage of the browser to implement targeted scanning and management, which is more convenient for the user.

In the above processes and structures, not all of the procedures and modules are necessary. Certain procedures or modules may be omitted according to the requirements. The order of the procedures is not fixed, and can be adjusted according to the requirements. The modules are defined based on function simply for facilitating description. In implementation, a module may be implemented by multiple modules and functions of multiple modules may be implemented by the same module. The modules may reside in the same device or distribute in different devices. The "first", "second" in the above descriptions are merely for distinguishing two similar objects, and have no substantial meanings.

According to various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

A machine-readable storage medium is also provided, which stores instructions to cause a machine to execute a method as described herein, more particularly, A system or apparatus having a storage medium which stores machine-readable program codes for implementing functions of any of the above examples and which may make the system or the apparatus (or CPU or MPU) read and execute the program codes stored in the storage medium. Instructions of the program codes may cause an operating system running in a computer to implement part or all of the operations. The program codes implemented from a storage medium are written in a storage device in an extension board inserted in the computer or in a storage in an extension unit connected to the computer. In this example, a CPU in the extension board or the extension unit executes at least part of the operations according to the instructions based on the program codes to recognize the technical scheme of any of the above examples.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

The scope of the claims should not be limited by the embodiments set forth in the examples, but should be given the broadest interpretation consistent with the description as a whole.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. A method for enabling a mobile browser to perform a scan of a mobile device that executes the mobile browser, the method comprising:
running, by the mobile device, the mobile browser having an embedded device scan program or an embedded Application Programming Interface (API) of a device scan program;
receiving, by the mobile browser run by the mobile device, a device scan request triggered when a user selects a device scan function of the embedded device scan program or the device scan program of the API using the mobile browser by entering a pre-defined web address into an address bar of the mobile browser that corresponds to the device scan function or selecting the device function from a browser page generated by the mobile browser;
calling, by the mobile browser run by the mobile device, the embedded device scan program or the embedded API in response to the receiving the device scan request to run the device scan program on the mobile device to scan one or a combination of hardware and battery resource information of the mobile device that runs the mobile browser, the hardware resource information including memory usage information of the mobile device; and
displaying, by the mobile browser, a scan result obtained by the device scan program in a scan result displaying interface of the mobile browser, wherein
the embedded device scan program or the embedded API called by the mobile browser allows the user to check and manage the mobile device more conveniently and exempts the user from downloading a dedicated device scan program.

2. The method of claim 1, wherein
the device scan request is triggered when the user selects the device scan function from a plurality of displayed device scan functions and a check now graphical element in a device scan interface presented by the browser page.

3. The method of claim 2, wherein the embedded API is an object class file generated by encapsulating the device scan program.

4. The method of claim 3, wherein when the device scan program comprises a device check and optimization program, the calling the embedded device scan program or the embedded API and the displaying the scan result comprises:
running the device check and optimization program to check the mobile device, and displaying a check result on a check result displaying interface of the mobile browser; and
running the device check and optimization program to optimize the mobile device based on the check result after an optimization request is received from the user, and displaying an optimization result on the scan result displaying interface of the mobile browser.

5. The method of claim 3, wherein when the device scan program comprises a device check program, the calling the embedded device scan program or the embedded API and the displaying the scan result on the scan result displaying interface of the mobile browser comprises:
running the device check program, and displaying a checking result on the scan result displaying interface of the mobile browser as the scan result.

6. The method of claim 1, further comprising: before the receiving the device scan request,
providing a device scan interface on a start page of the mobile browser, which corresponds to the browser page, or in a function list of the mobile browser for each of at least two pre-defined device scan programs or APIs embedded in the mobile browser, and generating prompt information for each of the at least two device scan programs or APIs; and
displaying the prompt information of the at least two device scan programs or APIs embedded in the mobile browser so that the user can select the device scan function based on the prompt information and trigger the device scan request which includes the prompt information corresponding to one of the at least two device scan programs or APIs.

7. The method of claim 6, wherein the calling by the mobile browser the embedded device scan program or the embedded API comprises:
obtaining, from the at least two device scan programs or APIs, the device scan program or the API identified by the prompt information in the device scan request from the at least two device scan programs or APIs; and
calling the device scan program or the API identified by the prompt information.

8. An apparatus for enabling a mobile browser to perform a scan of the apparatus that executes the mobile browser, the apparatus comprising: a processor and a memory storing computer-readable instructions executable by the processor to:
run the mobile browser having an embedded device scan program or an embedded Application Programming Interface (API) of a device scan program;
receive, by the mobile browser, a device scan request triggered when a user selects a device scan function of the embedded device scan program or the device scan program of the API using the mobile browser by entering a pre-defined web address into an address bar of the mobile browser that corresponds to the device scan function or selecting the device function from a browser page generated by the mobile browser;
call, by the mobile browser, the embedded device scan program or the embedded API in the mobile browser in response to the device scan request received to run the device scan program which scans one or a combination of hardware and battery resource information of the apparatus that runs the mobile browser, the hardware resource information including memory usage information of the apparatus; and
display, by the mobile browser, a scan result obtained by the device scan program in a scan result displaying interface of the mobile browser, wherein
the embedded device scan program or the embedded API called by the mobile browser allows the user to check and manage the apparatus more conveniently and exempts the user from downloading a dedicated device scan program.

9. The apparatus of claim 8, wherein
the device scan request is triggered when the user selects the device scan function from a plurality of displayed device scan functions and a check now graphical element in a device scan interface presented by the browser page.

10. The apparatus of claim 9, wherein the embedded. API is an object class file generated by encapsulating the device scan program.

11. The apparatus of claim 10, wherein the device scan program comprises a device check and optimization program, the instructions are executable by the processor to:
run the device check and optimization program to check the apparatus, display a check result on a check result displaying interface of the mobile browser;
run the device check and optimization program to optimize the apparatus based on the check result after an optimization request is received from the user; and
display an optimization result on the scan result displaying interface.

12. The apparatus of claim 10, wherein when the device scan program comprises a device check program, the instructions are executable by the processor to:
run the device check program and display a checking result on the scanning result displaying interface of the mobile browser as the scanning result.

13. The apparatus of claim 8, wherein the instructions are executable by the processor to:
provide a device scan interface on a start page of the mobile browser, which corresponds to the browser page, or in a function list of the mobile browser for each of at least two device scan programs or APIs embedded in the mobile browser, and generate prompt information for each of the at least two device scan programs or APIs; and
display the prompt information of the at least two device scan programs or APIs embedded in the mobile browser so that the user can select the device scan function based on the prompt information and trigger the device scan request which includes the prompt information corresponding to one of the at least two device scan programs or APIs.

14. The apparatus of claim 13, wherein the instructions are executable by the processor to:
obtain, from the at least two device scan programs or APIs, the device scan program or the API identified by the prompt information in the received device scan request, and call the obtained device scan program or the API to scan the apparatus.

15. A non-transitory computer-readable storage medium, comprising a series of computer-executable instructions which when executed by a processor of a mobile device cause the processor to perform a method comprising:
running a mobile browser having an embedded device scan program or an embedded Application Programming Interface (API) of a device scan program;
receiving, by the mobile browser, a device scan request triggered when a user selects a device scan function of the embedded device scan program or the device scan program of the API using the mobile browser by entering a pre-defined web address into an address bar of the mobile browser that corresponds to the device scan function or selecting the device function from a browser page generated by the mobile browser;
calling, by the mobile browser, the embedded device scan program or the embedded API in response to the device scan request received to run the device scan program on the mobile device to scan one or a combination of hardware and battery resource information of the mobile device that runs the mobile browser, the hardware resource information including memory usage information of the mobile device; and
displaying a scan result obtained by the device scan program in a scan result displaying interface of the mobile browser, wherein
the embedded device scan program or the embedded API called by the mobile browser allows the user to check and manage the mobile device more conveniently and exempts the user from downloading a dedicated device scan program.

16. The non-transitory computer-readable storage medium of claim 15, wherein
the device scan request is triggered when the user selects the device scan function from a plurality of displayed device scan functions and a check now graphical element in a device scan interface presented by the browser page.

17. The non-transitory computer-readable storage medium of claim 16, wherein the embedded API is an object class file generated by encapsulating the device scan program.

18. The non-transitory computer-readable storage medium of claim 17, wherein when the device scan program comprises a device check and optimization program, the calling the embedded device scan program or the embedded API and the displaying the scan result comprises:
running the device check and optimization program to check the mobile device, and displaying a check result on a check result displaying interface of the mobile browser; and
running the device check and optimization program to optimize the mobile device based on the check result after an optimization request is received from the user, and displaying an optimization result on the scan result displaying interface of the mobile browser as the scan result.

19. The non-transitory computer-readable storage medium of claim 17, wherein when the device scan program comprises a device check program, the calling the embedded device scan program or the embedded API and the displaying the scan result comprises:
running the device check program, and displaying a checking result on the scan result displaying interface of the mobile browser as the scan result.

20. The non-transitory computer-readable storage medium of claim 15, the method further comprising before the receiving the device scan request,
providing a device scan interface on a start page of the mobile browser, corresponding to the browser page, or in a function list of the mobile browser for each of at least two device scan programs or APIs embedded in the mobile browser, and generating prompt information for each of the at least two device scan programs or APIs: and
displaying the prompt information of the at least two device scan programs or APIs embedded in the mobile browser so that the user can select the device scan function based on the prompt information and trigger the device scan request which includes the prompt information corresponding to one of the at least two device scan programs or APIs.

* * * * *